United States Patent [19]

Olschewski et al.

[11] 4,402,558

[45] Sep. 6, 1983

[54] ROLLING BEARING

[75] Inventors: Armin Olschewski, Schweinfurt; Manfred Brandenstein, Eussenheim; Walter Lothar, Schweinfurt, all of Fed. Rep. of Germany

[73] Assignee: SKF Industries, Inc., King of Prussia, Pa.

[21] Appl. No.: 331,596

[22] Filed: Dec. 17, 1981

[30] Foreign Application Priority Data

Dec. 24, 1980 [DE] Fed. Rep. of Germany ....... 3049090

[51] Int. Cl.³ ............................................. F16C 1/24
[52] U.S. Cl. .................................. 308/187; 308/187.1
[58] Field of Search .................. 308/187.1, 187.2, 187, 308/86; 277/25; 384/135, 136, 380, 392, 404

[56] References Cited

U.S. PATENT DOCUMENTS 3,685,838  8/1972  Malmstrom ........................... 277/25

FOREIGN PATENT DOCUMENTS 3012421 10/1981 Fed. Rep. of Germany ... 308/187.1
2030236  4/1980 United Kingdom ............. 308/187.1

*Primary Examiner*—Stuart S. Levy
*Assistant Examiner*—Thomas R. Hannon
*Attorney, Agent, or Firm*—Eugene E. Renz, Jr.

[57] ABSTRACT

A rolling bearing assembly particularly adapted for wheel bearings in vehicles comprising an inner ring having at least one radially outwardly directed mounting flange, an outer ring and a plurality of rolling elements in the annular space between the inner and outer rings, at least one cap member secured to the inner ring having an annular rim section directed towards the outer ring and a seal ring secured to the outer ring in sliding engagement with said cap member under the rim thereof, said rim portion incuding at least one lubricant collector chamber defined in part by a radially inwardly facing wall portion and including at least one relatively small opening in said wall portion communicating with said lubricant collector chamber.

10 Claims, 6 Drawing Figures

ROLLING BEARING

BACKGROUND AND SUMMARY OF THE INVENTION

The present invention relates to rolling bearings and particularly to an improvement in wheel bearings for road vehicles such as automobiles. These bearing assemblies typically comprise an inner ring having a radially outwardly directed mounting flange, an outer ring, and a plurality of rolling elements in the annular space between the inner and outer rings and at least one cap mounted on the inner ring and arranged at one axial end of the outer ring, the cap having a rim section directed towards the outer ring and a sealing ring fastened to the outer ring and sliding radially on the cap under the rim section.

Wheel bearing assemblies of this general type are known in the prior art. For example, in German Utility Patent No. 7,434,724, the assembly includes a space laterally open to the outer ring which is covered by the rim of a cap. In this instance, the sealing lips of the seal ring slide on the radial section of the cap which runs relatively cool in comparison with the inner ring. Consequently, the relatively sensitive sealing lips experience only a slight thermal stress during operation and therefore have a relatively long service life. When the sliding sealing lips of the seal ring start to wear after extended operation, the lubricant of the rolling bearing leaks out under the sealing lips of the seal ring then migrates to the space covered by the rim of the cap and accumulates there. This space, however, is laterally open towards the outer ring and consequently the lubricant is not always retained in this space with any degree of certainty.

In accordance with another prior art assembly shown in German Patent Application No. 3,012,421.1 a lubricant collector is formed between the seal ring and the mounting flange of the inner ring and covered radially to the outside and laterally by the free end of the cap. The lubricant which is usually grease in this instance can freely move radially inwardly occasioned by radial driving shocks and corresponding mass forces affecting the lubricant and there penetrate into the space or interstice between the mounting flange of the inner ring and the seal ring of the outer ring. There is usually a predetermined amount of play in the rolling bearing and consequently, the interstice or space between the mounting flange and the seal ring varies continually by reason of the fact that the outer ring moves within certain limits relative to the inner ring. Thus the lubricant in the space or interstice may be pumped into the area of the rolling bearing under certain operating conditions and cause damage.

With the above in mind, it is an object of the present invention to provide an improved rolling bearing specifically adapted for wheel bearing assemblies which is characterized by novel features of construction and arrangement producing a reduction in the wear of the sealing lips of the seal ring and assuring at the same time, that even in extreme cases or circumstances, lubricant does not migrate from the rolling bearing to the area outside the rolling bearing. Additionally, the rolling bearing assembly of the present invention can be produced economically and installed very simply. To this end, the rim of the cap is provided at its outer circumference with at least one lubricant collector closed off to the outside radially and laterally which is defined by a radially inwardly located wall of the rim and at least one small port or opening in the radially inwardly located wall which runs into the lubricant collector. By this arrangement, lubricant in the lubricant collector can only penetrate via small holes or ports which throttle the flow into the space or interstice between the seal ring and the cap. Thus when driving shocks occur during normal operation and momentary radially inwardly directed mass forces, only a very small quantity of lubricant can penetrate through the small openings into the lubricant space. Consequently, the danger of lubricant accumulation in the interstice is eliminated which as noted above under certain circumstances can migrate through the sealing slot and/or under the sealing lip of the seal ring and cause damage in the area of the rolling bearing, for example, on the friction surface of disc brakes. Further, since the sensitive sealing lips of the seal ring slide on the relatively cool portion of the cap, there is comparatively little wear in operation compared to the prior arrangement dicussed above where the engagement is with the inner ring which is heated by the disc brake and therefore the seal ring has a more favorable long, useful service life.

Other more specific features of the invention described in more detail hereafter provide additional functional advantages. For example, in accordance with the principal embodiment, the lubricant collector is formed by a single annular space or chamber in the rim section of the cap which chamber is defined by a radially outer wall, a radially inner wall, and at least on the side thereof facing toward the outer ring by a side wall of the rim. By this arrangement a relatively large lubricant collector can be simply formed in the cap and at the same time maintain a compact construction of the rolling bearing.

The lubricant collector opens radially inward in at least one closed slot or space formed between a radial wall section of the cap and a spaced confronting surface of the mounting flange of the inner ring. By this arrangement, there is not only an additional enlargement of the lubricant collector by reason of the connecting slot or space but also a more favorable heat insulation of the radial section of the mounting flange of the inner ring is attained.

The radially extending section of the cap may be provided with a centering shoulder at its radial outer end for fastening the cap on the inner ring and this arrangement provides a relatively simple and easy means for centering the cap on the inner ring. Further, the cap is mounted in such a fashion that it is axially slidable on the inner ring. Accordingly during assembly, the cap can be supported at a greater distance from the outer ring so that the sensitive lips of the seal ring is not touching the cap and the outer ring can be freely placed in a tilted or eccentric position to the inner ring and the rolling elements easily inserted between the inner ring and outer ring in a conventional manner. After completely inserting the rolling elements, the cap can be axially adjusted against the outer ring and the seal ring and be fastened to the inner ring in the desired position. In accordance with the present invention, an elastic medium may be provided between the cap and the opposite mounting flange of the inner ring which axially adjusts the cap against the shoulder of the inner ring. By this arrangement, fabrication and installation of the rolling bearing are simplified because the cap is automatically pressed against the shoulder of the inner ring by the elastic medium. The cap is also supported on the inner ring without play even when comparatively large fabrication tolerences are present between the cap and the inner ring which facilitates economical manufacture of these parts.

In accordance with another feature of the present invention, the lubricant collector is at least partly filled with a lubricant absorbing material. This provides additional means for holding the lubricant in the collector. Furthermore, the oil absorbing material serves as a heat insulating medium which inhibits the heat conduction from the inner ring to the slide surfaces of the temperature sensitive sealing lips of the seal ring of the cap.

To further simplify and render production more economical, the cap may be formed from strip material and formed in a press or stamping process without machining which makes mass production possible.

BRIEF DESCRIPTION OF THE DRAWINGS

These and other objects of the present invention and the features and details of the construction and operation thereof are hereinafter more fully set forth with reference to the accompanying drawings, wherein.

DESCRIPTION OF THE PREFERRED EMBODIMENT

Figure 1:
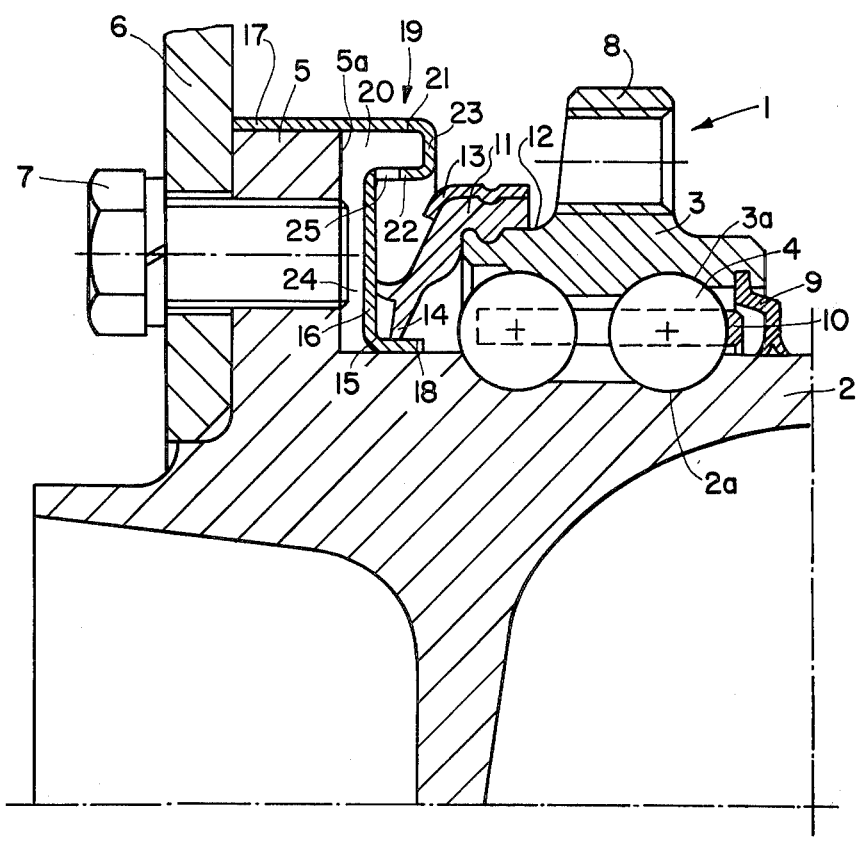
FIG. 1 is a longitudinal sectional view through a rolling bearing of a wheel bearing assembly in accordance with the present invention.

Referring now to the drawings and particularly FIG. 1 thereof, there is illustrated a wheel bearing assembly particularly for an automobile which is generally designated by the numeral 1. The assembly comprises an inner ring 2, an outer ring member 3 and a plurality of rolling elements, in the present instance balls 4 arranged in two rows in the annular space between inner and outer raceways 2a and 3a formed in the confronting surfaces of the inner and outer rings. The inner ring is rotatably driven in a known manner by a driveshaft (not shown) connected to the inner ring and has at one axial end a radially outwardly directed mounting flange 5 to which the wheel rim 6 may be fastened by a series of circumferentially spaced bolts 7. The outer ring 3 has a radially outwardly directed flange 8 for fastening the outer ring to the wheel mounting elements of the wheel frame. The assembly further includes a seal ring 9 which is mounted at one axial end in the bore of the outer ring 3 and slides on the extended portion of the inner ring on the land surface outboard of the inner raceway. A conventional cage 10 guides and spaces the balls.

A seal ring 11 is mounted on the outer ring at the axial end thereof opposite the seal ring 9. In the present instance the seal ring 11 is supported on the outer peripheral surface 12 of the outer ring by means of a laterally extending guard ring 13 which also protects the seal ring against the impact from foreign objects, such as stones. The seal ring 11 has a bifurcated outer sealing lips 14 which slide on a cap 15 mounted on the side of the outer ring facing towards the mounting flange 5. The cap may be produced without machining from strip material in a press and stamping process. The cap as illustrated has a radial section 16 against which one of the lips 14 slides, an outer axially extending section 17 overlying and secured to the peripheral surface of the mounting flange 5 and an inner axial section 18 defining a centering shoulder at its inner end which is axially slidable on the land surface of the inner ring outboard of the inner raceways.

The cap 15 is of a predetermined configuration to define a lubricant collector chamber 20 which is illustrated is closed off radially to the outside and laterally. More specifically the annular collector chamber 20 is formed by an annular space defined by a rim portion 19 of the cap 15. More specifically, the annular space is defined by the portion of the axial wall section of the cap which does not overlie the flange 5, designated by the numeral 21, a short axial wall section 22 spaced radially inwardly of the wall section 21 and a radial connecting wall or sidewall 23 connecting the wall sections 21 and 22. A plurality of circumferentially spaced small ports 25 which may be machined by stamping or drilling are formed in the connecting wall section 22. As illustrated on the side opposite the connecting wall 23, the lubricant collector chamber 20 is closed off by the side face or surface 5a of the mounting flange 5. Further, as illustrated, the lubricant collector chamber 20 has radially inwardly directed slot space 24 defined by the radial section 16 of the cap and the confronting face 5a of the mounting flange 5.

Consider now operation of the bearing assembly when the seal lips 14 which as illustrated slide on the radial and axial wall section 16 and 18 of the cap 15 show signs and wear after prolonged operation and lubricant such as grease which is packed in the annular space between the inner and outer rings 2, 3 starts to bypass the sealing lips. This migrating lubricant is collected at the radial inner wall 22 and passes through the ports 25 into the lubricant collector chamber 20. Accordingly, in the present instance, since the inner ring 2 rotates along with the cap 15 secured on the ring, the leaking lubricant is propelled effectively into the lubricant collector chamber 20 by centrifugal force.

The parts of the bearing assembly are easy and economical to make and may be assembled readily in a very simple fashion. For example, in assembling the bearing, the wheel rim 6 is not initially bolted to the mounting flange 5 of the inner ring and therefore the cap 15 can be held at a greater distance on the inner ring 2 by the outer ring 3 so that the slot space 24 disappears. In this position, the sealing lips are out of contact with the cap. This permits easy insertion of the balls 4 between the inner and the outer rings since the outer ring 3 can be freely tilted or positioned eccentrically relative to the inner ring 2 without pinching or damaging the sealing lips 14 on the cap 15. After assembly of the balls 4 and installation of the cage 10, the inner and outer rings are held concentrically together by the balls 4. The cap 15 can then be freely axially adjusted on the inner ring 2. In this position, the wheel rim 6 can be bolted to the mounting flange 5 and in this position the cap 15 abuts the wheel rim 6 and is restrained against lateral movement relative to the inner ring 2.

Figure 2:
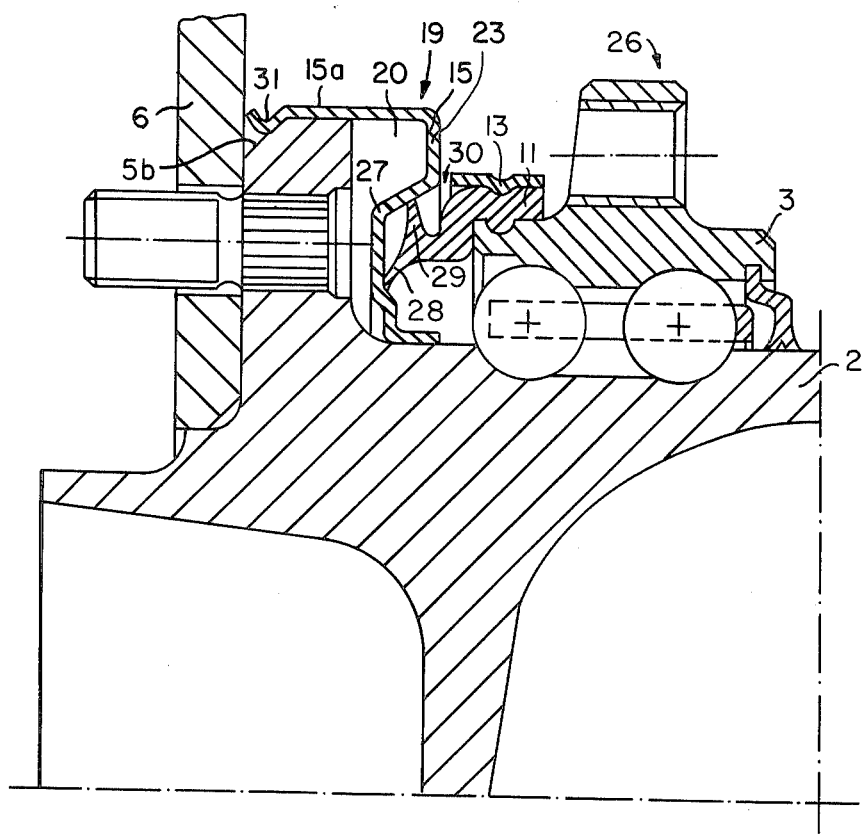
FIGS. 2, 3 and 4 are similar sectional views showing modifications of the present invention.

There is illustrated in FIG. 2 a modified rolling bearing of a wheel bearing assembly in accordance with the present invention which is generally designated by the numeral 26. This embodiment of the invention is generally similar to that shown in FIG. 1 and comprises inner and outer rings with two rows of rolling elements, balls, in the annular space between the rings and a flange at one axial end of the inner ring to which the wheel rim 6 can be secured by suitable fasteners. In the present instance, however, the cap 15 has a series of circumferentially spaced small ports or openings 27 located in a frusto conical intermediate wall between the wall of the cap and the seal ring 11. The seal ring 11 has bifurcated circumferentially extending sealing lips 28 and 29 which engage the outer periphery of the cap 15 and straddle the openings or ports 27. By this arrangement, the outer lip 29 prevents penetration of moisture from the ambient atmosphere into the lubricant collecting chamber 20. In accordance with this embodiment of the invention, a narrow sealing slot 30 is formed between the radial sidewall 23 of the cap 15 and the front terminal edge of the guard ring 13. This small sealing slot protects the sealing lips 28 and 29 from damage which may be occasioned by preventing ingress of large particles such as stones.

In accordance with this embodiment, the cap 15 is also axially slidable on the inner ring to facilitate easy assembly of the elements of the rolling bearing 26 in the manner described above. In this instance, the terminal edge of the outer axial portion 15a of the cap has a radially inwardly directed bead-shaped groove 31 which snaps over the mounting flange 5 and seats on a beveled shoulder 5b of the mounting flange 5 to laterally lock the cap on the inner ring 2.

Figure 3:
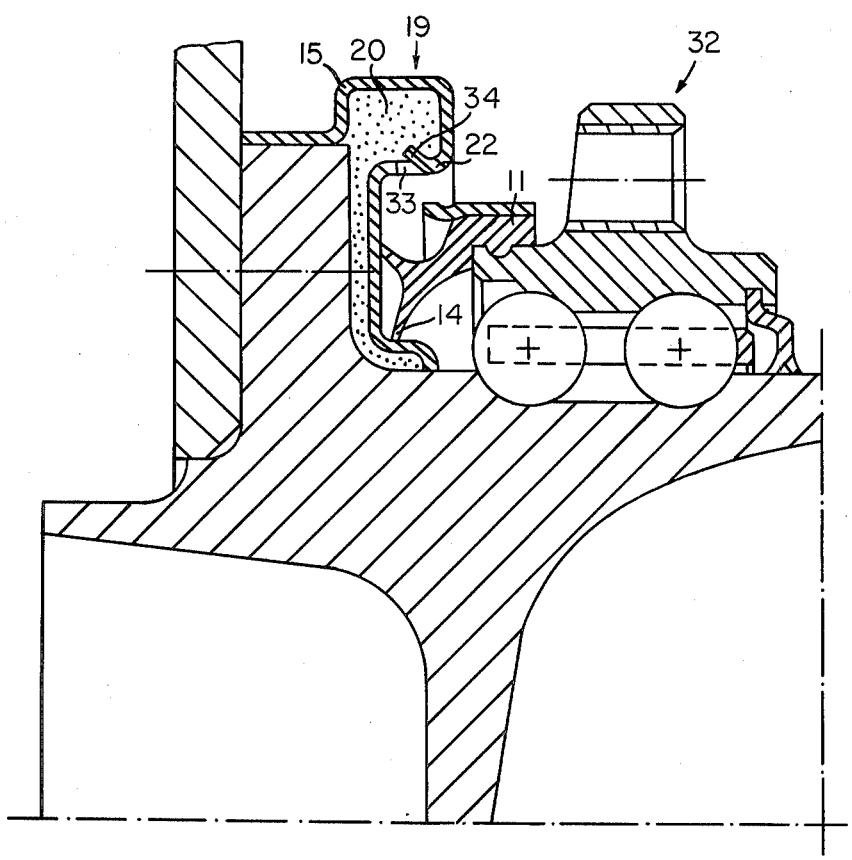

FIG. 3 shows a further modified rolling bearing assembly in accordance with the present invention generally designated by the numeral 32. Here again the overall assembly is generally similar to that shown and described in connection with FIGS. 1 and 2. However, in this instance the lubricant collector chamber 20 is filled with an oil absorbing material, for example, an open pore foam-type plastic which may be injected into the lubricant collecting chamber 20. Further, in this instance relatively small ports or openings 33 are formed by narrow slots formed between a clip 34 pushed radially outward into the lubricant collector chamber 20 and the corresponding cut edges of the wall 22. By this arrangement, lubricant bypassing the sealing lip 14 of the seal ring 11 is collected on the wall 22 and is conveyed into the lubricant collector chamber along the inclined radially outwardly directed surface of the clip 34.

Figure 4:
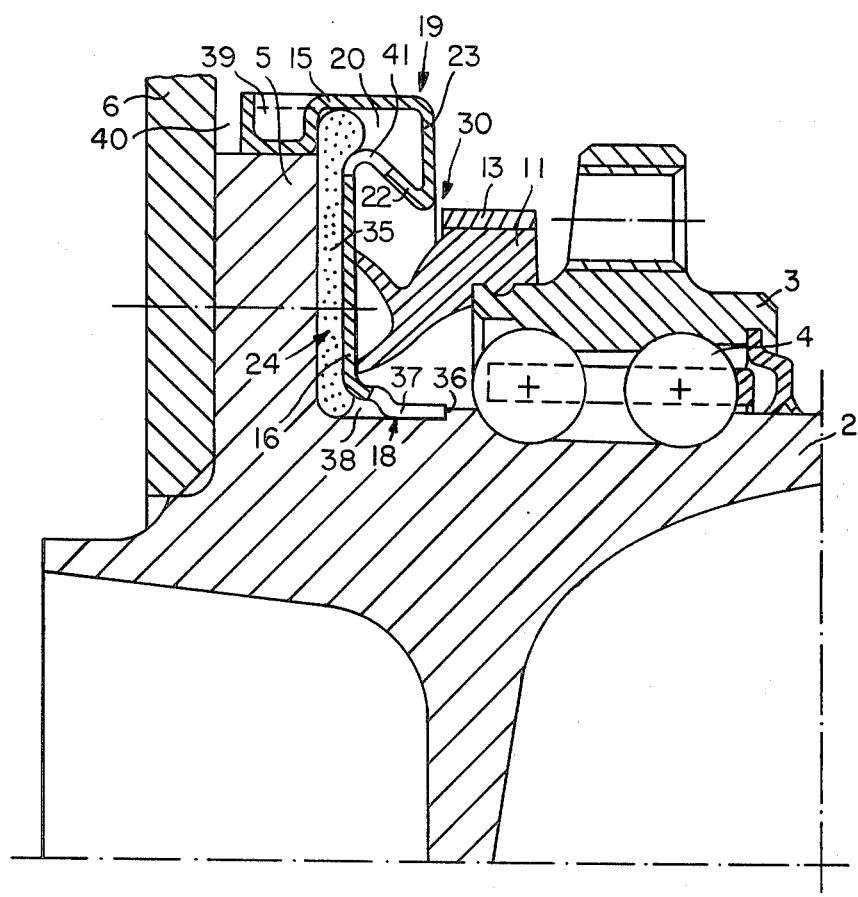

A further modified rolling bearing in accordance with the present invention is shown in FIG. 4. This arrangement is generally similar to that described previously. However, in this instance a sealing disc 35 of elastically compressible heat insulating material, for example, plastic is mounted between the radial section 16 of the cap 15 and the mounting flange 5. This sealing disc 35 seals the slot space 24 so that lubricant cannot penetrate this area. Moreover, the sealing disc 35 is used in this case as an elastic medium axially adjusting the centering shoulder 18 of the cap 15 against a shoulder 36 formed on the inner ring 2. The centering section 18 has a plurality of circumferentially spaced axially extending slits so that the shoulder can be snapped into the annular groove 38 from the outside surface of the inner ring 2. At the radially outer surface of the cap 15 facing away from the outer ring 3, radially inwardly directed recesses 39 are located on the outside surface of the mounting flange 5 by molding. By this construction the wheel rim 6 does not have to be removed when the cap 15 has to be moved axially away from the outer ring 3 in a direction toward the inner ring, for example, for assembling the rolling elements 4 or to replace for example, the seal ring 11. This is the case by reason of a large enough axial distance 40 between the front surface of the radially outer end of the cap 15 facing away from the outer ring 3 and the opposite side surface of the wheel rim 6. The cap 15 therefore, can be moved axially against the spring pressure of the sealing disc 35 so that the centering shoulder 18 is moved axially away from the shoulder 36. For this purpose, the cap can be grasped with a suitable tool which engages in the recess 39 to move the cap assembly axially against the shoulder 36 by the elastic sealing disc 35 and is readied for operation in this way.

This cap assembly also has a collector chamber 20 formed by an annular space and in this instance narrow axial slots are formed in the radially inwardly located wall 22 which define relatively small open holes 41 in that wall. The wall configuration of the cap defining the collector chamber 20 is closely spaced axially to the front edge of the guard ring 13 providing only a very narrow sealing slot 30. This keeps out relatively large particulate foreign matter.

While particular embodiments of the present invention have been illustrated and described herein, it is not intended to limit the invention and changes and modifications may be made therein within the scope of the following claims. For example, in the embodiments illustrated and described, the bearing cap is made of strip material which does not require machining. It is to be understood, however, that the cap can also be made of castable materials, for example, in a die casting process. It is also possible to form the cap from solid stock by machining.

Figure 5:
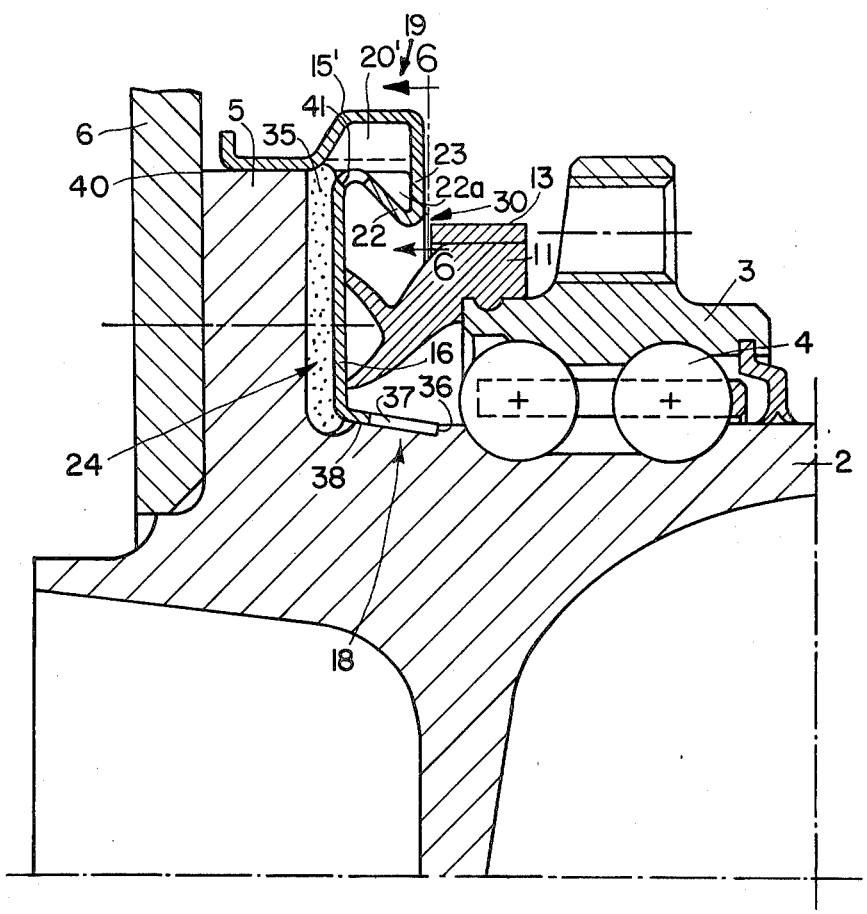
FIGS. 5 and 6 are sectional views of another modification in accordance with the present invention.
Figure 6:
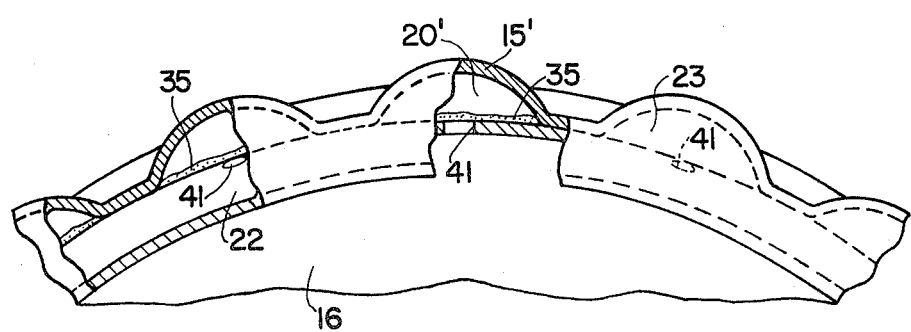

Further, while the lubricant collector chambers of the various embodiments are continuous annular chambers, an alternate arrangement as shown in FIGS. 5 and 6 is possible. As illustrated, several lubricant collecting chambers may be formed which are arranged at the periphery of the cap and closed off for example, in a circumferential direction so that there are a series of circumferentially spaced lubricant collector compartments defined by radially inwardly located walls 20' of the cap. These radially inwardly directed walls 20' which divide the lubricant collector chamber into a plurality of compartments may be provided with at least one relatively small opening 41 and in this way, a movement of the lubricant in the collector chamber is restricted or inhibited in a circumferential direction. There is however, communication in a circumferential direction, provided below the divider walls 20' in the form of an annular space 22a. This precludes heavy accumulation of grease in only one pocket or compartment on the circumference which may produce an undesirable unbalance during rotation of the inner ring. This arrangement, therefore, would prevent a harmful or deleterious foaming of the lubricant in the lubricant collecting chamber which may occur in a rapidly accelerating automobile wheel with high acceleration forces affecting the lubricant.

Finally, it is also possible to provide a mounting flange similar to the flange 5 on both sides of the inner ring and in this instance a cap fastened on the inner ring is present on both sides of the outer ring. In this instance, one of the flanges is removably mounted on the inner ring in order to permit assembly of the rolling elements. In the case of a two flange inner ring, the wheel hub may be mounted on the flange at one side and the brake elements (disc brake) may be mounted on the opposite side of the bearing. Each cap then has a radially extending section between the outer ring and the appropriate mounting flange with a rim portion of the cap continuing at its radial outer end directed towards the opposite side of the outer ring. The seal ring sliding radially under the rim portion on the appropriate cap and fastened to the outer ring is then present each time.

What is claimed is:

1. A rolling bearing assembly particularly adapted for wheel bearings in vehicles comprising an inner ring having at least one radially outwardly directed mounting flange, an outer ring and a plurality of rolling elements in the annular space between the inner and outer rings, at least one cap member secured to the inner ring having an annular rim section directed towards the outer ring and a seal ring secured to the outer ring in sliding engagement with said cap member under the rim thereof, said rim portion including at least one lubricant collector chamber defined in part by a radially inwardly facing wall portion and including at least one relatively small opening in said wall portion communicating with said lubricant collector chamber.

2. A rolling bearing assembly as claimed in claim 1 wherein said lubricant collector chamber is formed by a single annular space in the rim of the cap which is defined by an axially extending outer wall portion (21), and a connecting side wall (23) at least on its side facing the outer ring which connects said radially inwardly facing wall and said outer wall portion (21).

3. A rolling bearing assembly as claimed in claim 1 wherein said lubricant collector chamber opens out radially inwardly in at least one closed slot space (24) formed between a radial wall section (16) of the cap and the confronting circumferentially extending wall portion of the mounting flange of said inner ring.

4. A rolling bearing assembly as claimed in claim 3 wherein said radially extending wall section (16) of the cap includes a centering shoulder at its outer radial edge in order to fasten said cap on said inner ring.

5. A rolling bearing assembly as claimed in claim 3 wherein said radially extending wall section (16) of the cap includes a centering shoulder at its radial inner edge in order to fasten said cap on said inner ring.

6. A rolling bearing assembly as claimed in claim 1 wherein said cap member is axially slidable relative to said inner ring.

7. A rolling bearing assembly as claimed in claim 1 including an elastic medium between the cap and the said confronting face of the mounting flange of the inner ring providing means for axially adjusting the cap against a shoulder (36) of said inner ring.

8. A rolling bearing assembly as claimed in claim 1 wherein said lubricant collector chamber is at least partially filled with a material capable of absorbing a lubricant.

9. A rolling bearing assembly as claimed in claim 1 wherein said cap member is made from strip material without machining.

10. A rolling bearing assembly as claimed in claim 1 wherein said lubricant collector chamber is divided into a plurality of circumferentially segregated compartments by a series of circumferentially spaced radially extending wall portions and including at least one small opening in each of said wall portions providing limited fluid communication between said compartments.

* * * * *